(12) United States Patent
Hong

(10) Patent No.: US 8,014,525 B2
(45) Date of Patent: Sep. 6, 2011

(54) DIGITAL BROADCASTING TRANSMITTING SYSTEM FOR CONDITIONAL ACCESS AND METHOD THEREOF, AND DIGITAL BROADCASTING RECEIVING TERMINAL AND METHOD THEREOF

(75) Inventor: Chung-Pyo Hong, Seoul (KR)

(73) Assignee: KTFREETEL Co. Ltd., Seoul (KR)

( * ) Notice: Subject to any disclaimer, the term of this patent is extended or adjusted under 35 U.S.C. 154(b) by 1034 days.

(21) Appl. No.: 11/815,954

(22) PCT Filed: Oct. 23, 2006

(86) PCT No.: PCT/KR2006/004327
§ 371 (c)(1),
(2), (4) Date: Aug. 9, 2007

(87) PCT Pub. No.: WO2007/046678
PCT Pub. Date: Apr. 26, 2007

(65) Prior Publication Data
US 2008/0144820 A1   Jun. 19, 2008

(30) Foreign Application Priority Data
Oct. 21, 2005   (KR) ........................ 10-2005-0099797

(51) Int. Cl.
*H04N 7/167* (2011.01)
(52) U.S. Cl. ....................................................... 380/212
(58) Field of Classification Search .................... 380/212
See application file for complete search history.

(56) References Cited

U.S. PATENT DOCUMENTS
6,115,800 A * 9/2000 Maeda .......................... 711/171
6,810,269 B1  10/2004 Aramaki
2004/0093614 A1* 5/2004 Sakurai et al. ................. 725/25
2004/0120529 A1* 6/2004 Zhang et al. .................. 380/278
2007/0133497 A1* 6/2007 Vare et al. ..................... 370/345

FOREIGN PATENT DOCUMENTS
| | | |
|---|---|---|
| GB | 2 399 986 A | 9/2004 |
| JP | 2006-211677 A | 8/2006 |
| KR | 10-2003-0036540 | 5/2003 |
| KR | 10-2004-0013665 | 2/2004 |
| WO | WO 2005/011189 | 2/2005 |

OTHER PUBLICATIONS

Written Opinion of the International Searching Authority for PCT/KR2006/004327.
International Search Report for PCT/KR2006/004327.
Search Report for Application No. EP 06 81 2197 dated Oct. 13, 2010.
Office Action for Japanese Application No. 2008-501824 dated Feb. 1, 2011.

\* cited by examiner

*Primary Examiner* — Nasser Moazzami
*Assistant Examiner* — Michael S McNally
(74) *Attorney, Agent, or Firm* — Alston & Bird LLP

(57) ABSTRACT

Disclosed are a conditional access transmission system and method, and a receiving terminal and method. The transmission system transmits scrambled broadcasting signals including a network identification code (NIC) in the digital broadcasting service. A repeating system repeats the broadcasting signals transmitted by the transmission system to a subscriber station. In this instance, the NIC of the repeating system is different from that of a main broadcasting network. A receiving terminal descrambles the scrambled broadcasting signals by using the NIC and a descrambling key. According to the present invention, the charged subscriber can receive broadcasting signals or TPEG messages in the repeating network.

29 Claims, 11 Drawing Sheets

FIG. 3

| S54 | S55 | S56 | S57 | S58 | S59 | S60 | S61 | S62 | S63 | S64 | S65 | S66 | S67 |
|-----|-----|-----|-----|-----|-----|-----|-----|-----|-----|-----|-----|-----|-----|
| 1   | 0   | 1   | 1   | 0   | 0   | 1   | 0   | 1   | 1   | 1   | 0   | 0   | 1   |

S54–S60: Used as main broadcasting network

S61–S67: Used as sub broadcasting network

FIG. 7

| Location | Subscriber Type | Received Key Value | Service Availability |
|---|---|---|---|
| A1 | Charged | Main Broadcasting Station NIC | O |
| A2 | Charged | Main Broadcasting Station NIC, Repeater Station NIC | O |
| A3 | Charged | Repeater Station NIC, Mobile Communication Descrambling Key | O |
| B1 | Uncharged | Main Broadcasting Station NIC | O |
| B2 | Uncharged | Main Broadcasting Station NIC, Repeater Station NIC | O |
| B3 | Uncharged | Repeater Station NIC | X |

DIGITAL BROADCASTING TRANSMITTING SYSTEM FOR CONDITIONAL ACCESS AND METHOD THEREOF, AND DIGITAL BROADCASTING RECEIVING TERMINAL AND METHOD THEREOF

BACKGROUND OF THE INVENTION (a) Field of the Invention

The present invention relates to a conditional access system (CAS), and in particular, it relates to a digital broadcast transmitting system and method for providing a conditional access to a user by each broadcasting service provider when there are plural broadcasting service providers, and a digital broadcasting receiving terminal and a method thereof in a single or multiple frequency network.

(b) Description of the Related Art

Digital broadcasting has characteristics of providing multiple channels, high quality, and multiple functions. In particular, development of multiplexing techniques has enabled concurrent combination of images, speech, and data irrespective of contents, size, and transmission thereof, and has formed a return channel through a modem to allow interactive services. Accordingly, digital data broadcasting has overcome the problems of conventional analog broadcasting and has provided multimedia services with high added value to viewers.

Particularly, the terrestrial digital video broadcasting (i.e., Digital Video Broadcasting-Terrestrial: DVB-T) and the DVB-T based digital mobile broadcasting (i.e., Digital Video Broadcasting-Handheld: DVB-H) among digital broadcasting standards are European digital TV broadcasting for transmitting video images and sound data to receivers through broadcasting wireless communication signals.

When no mutual stability system is guaranteed between the transmitter and the receiver in the above-noted digital broadcasting, the commercial broadcasting system cannot exist. Broadcasting service providers quality broadcasting services to subscribers by activating multiple channels and professional channels instead of the conventional services that depend on the advertisement incomes, provide charged broadcasting services such as the pay-TV and pay-per-view (PPV) services, and desire their various broadcast multimedia data to be protected and only provided to authenticated subscribers. The conditional access system (CAS) has been developed in order to solve the problems.

The CAS represents a system for allowing the subscribers who have a right to view programs to receive specific programs by applying the subscriber concept to the broadcasting, which indicates a series of processes for controlling each digital broadcasting receiver to determine whether to give a right to view a specific broadcasting program to a viewer.

Regarding general digital broadcasting, a transmitter for forming a main broadcasting network in the single or multiple frequency network is installed, a blanket area is generated in the main broadcasting network, and a repeater station is installed to service the blanket area. For example, in the DVB-T, most areas are available for directly receiving broadcasting signals, and areas available for receiving the same are acquired by using a repeater station in the areas such as subways, tunnels, and blanket areas within a building.

The main broadcasting station is generally called a key station, and it represents a broadcasting station for functioning as a main center and programming, producing, and transmitting broadcasting schedules in the broadcasting network system.

Also, a repeater station is an auxiliary station with less power, and is also called a satellite station. Conventionally, a broadcasting station has a service region, that is, a designated broadcasting region, but since boundary regions have weak radio wave arrival and blanket areas, the satellite station is installed for the boundary regions. It is installed at mountaintops for receiving radio waves from the transmitters, and it receives the waves through high-sensitivity receivers, electrically amplifies them, and broadcasts them as radio waves of different frequencies.

However, when a main broadcasting network service provider is different from a repeater service provider, the repeater service provider generates the cost of installing and maintaining a broadcasting network in the shade region, and the repeater service provider charges for the usage of the repeating network. That is, the repeater service must be a charged service for the purpose of activating the repeating network, but no appropriate treatment for the charged service has been provided up to now.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a digital broadcast transmission system and a method thereof, and a digital broadcast receiving terminal and a method thereof having advantages of controlling charged subscribers and free subscribers to receive a desired service within the coverage of the main broadcasting network and controlling charged subscribers to receive a desired service within the coverage of the repeating network in a broadcasting network having a single frequency network or a multiple frequency network.

In one aspect of the present invention, a system for transmitting digital broadcasting includes: a main broadcasting system for adding a data packet through a main broadcasting network and a network identification code (NIC) to broadcasting signals, scrambling the broadcasting signals by using a predetermined scrambling key, and outputting scrambled broadcasting signals wherein the main broadcasting system scrambles the predetermined key by using the NIC and transmits the scrambled key as a descrambling key; a repeating system for repeating the scrambled broadcasting signal transmitted by the main broadcasting system through a repeating network;

and a mobile communication system for receiving the descrambling key from the main broadcasting system or the repeating system and transmitting the same to a charged subscriber station wherein the charged subscriber station descrambles the scrambled broadcasting signals by using the NIC extracted from the scrambled broadcasting signals and the descrambling key. The digital broadcasting is based on the DVB-T (Digital Video Broadcasting-Terrestrial) method, and the NIC is included in a transmission parameter signaling (TPS) carrier used for transmitting a parameter of transmission data according to the DVB-T method.

In another aspect of the present invention, a method for transmitting digital broadcasting includes: a) multiplexing additional information related to broadcasting contents and generating a broadcasting signal; b) scrambling the generated broadcasting signal by using a predetermined scrambling key, and generating a scrambled broadcasting signal; c) inserting a NIC for identifying the transmission network having transmitted the scrambled broadcasting signal into the scrambled broadcasting signal wherein the transmission network includes a main broadcasting network and a repeating network; and d) transmitting the scrambled broadcasting signal, wherein the predetermined scrambling key is scrambled by the NIC to be thus output as a descrambling key wherein the descrambling key together with the NIC is used to descramble the scrambled broadcasting signal transmitted in d).

In another aspect of the present invention, a terminal for receiving DVB-T (Digital Video Broadcasting-Terrestrial) digital broadcasting includes: a DVB-T demodulator for demodulating a signal received through an antenna according to the DVB-T method and outputting a transmission parameter signaling (TPS) carrier used for transmitting scrambled broadcasting signals and a parameter of transmission data wherein the TPS carrier includes a network identification code (NIC); a NIC extractor for extracting the NIC from the TPS carrier output by the DVB-T demodulator; a decoder for decoding the scrambled broadcasting signal output by the DVB-T demodulator according to a decoding algorithm by using the NIC extracted from the NIC extractor; and a multimedia processor for processing the data decoded by the decoder and outputting the data to the user.

In another aspect of the present invention, a method for receiving digital broadcasting includes: a) receiving broadcasting signals including a data packet and a network identification code (NIC) wherein the NIC identifies the transmission network having transmitted the broadcasting signals; b) demodulating the broadcasting signals to extract the NIC; c) analyzing the extract NIC to determine whether the transmission network having transmitted the received broadcasting signals is a repeating network; and d) descrambling and outputting the broadcasting signals by using the NIC and descrambling key when it is determined that the transmission network having transmitted the broadcasting signal is a repeating network.

BRIEF DESCRIPTION OF THE DRAWINGS

FIG. 3 shows the case in which a redundancy bit is used as a transmission network identification code in a TPS carrier according to an embodiment of the present invention.

FIG. 7 shows a table for conditional access service availability for subscriber types and receiving locations according to an embodiment of the present invention.

DETAILED DESCRIPTION OF THE EMBODIMENTS

Figure 1:
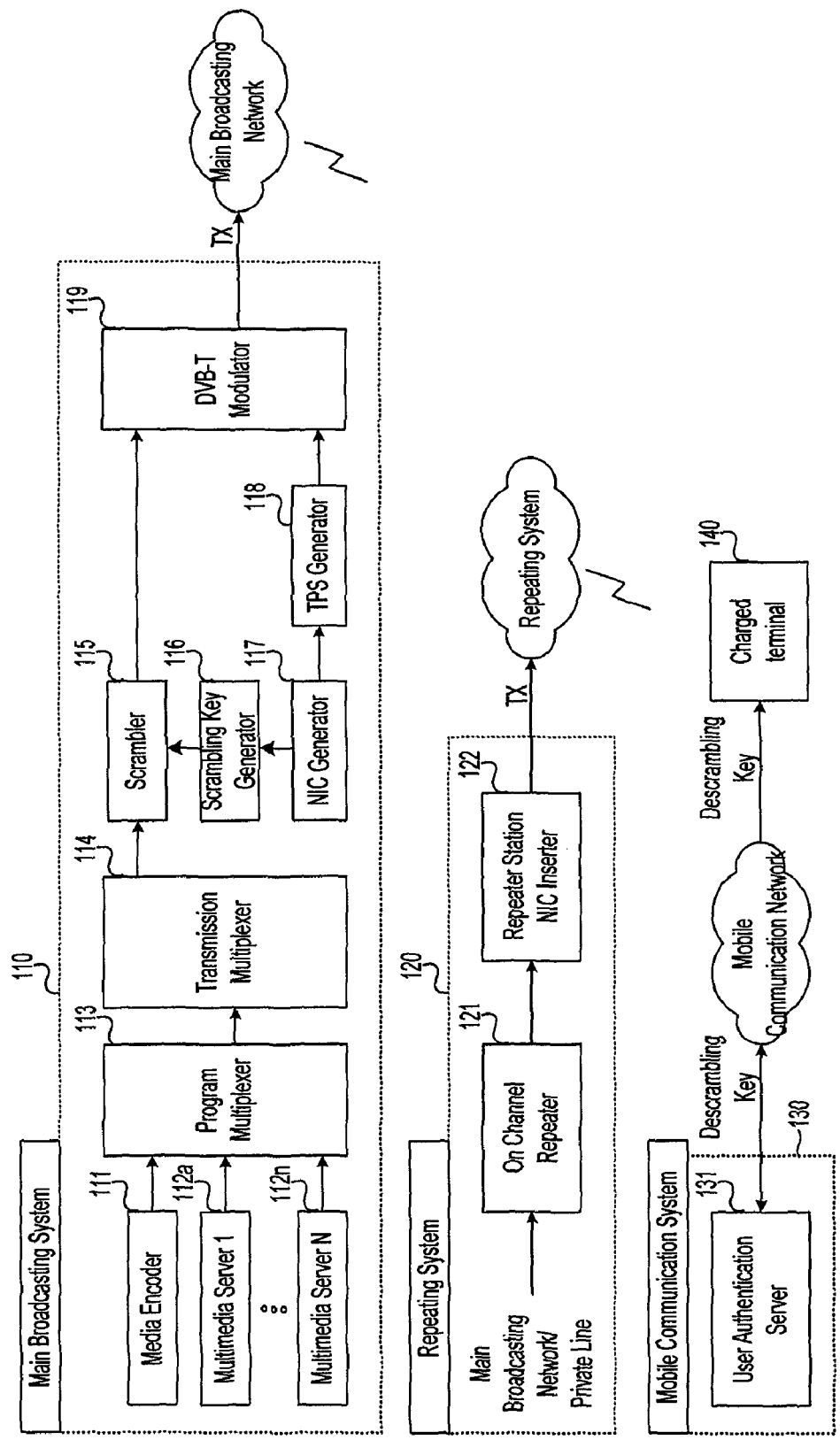
FIG. 1 shows a block diagram for a digital broadcast transmitting system according to an embodiment of the present invention.

An exemplary embodiment of the present invention will hereinafter be described in detail with reference to the accompanying drawings.

Referring to the drawings, a conditional access transmission system and method thereof, and a receiving terminal and a method thereof according to an embodiment of the present invention will now be described in detail.

The embodiment of the present invention discloses a digital broadcasting conditional access system (CAS) for controlling conditional access for respective transmitters by scrambling the data packets transmitted to a subscriber and applying part of the transmission parameter signaling (TPS) carriers, that is, network identification codes (NICs), used for transmitting parameters of transmission data as key values of transmitted data packets in the DVB-T system.

In other words, a digital broadcasting system for controlling a receiver to restrict access to each transmitter according to transmission service providers when the transmission service providers are different on a single or multiple frequency network in a digital broadcasting system (in particular, the DVB-T or DVB-H) will be disclosed in the embodiment of the present invention.

In detail, in the broadcasting network having a single or multiple frequency network, charged subscribers and free subscribers can receive a service within a coverage area of the main broadcasting network, and the charged subscribers can receive the service within the coverage area of the repeating network. Also, the free subscribers and charged subscribers can concurrently receive the service within a superimposed coverage area of the main broadcasting network and the repeating network. In this instance, it is needed as prerequisites for the service of the main broadcasting networks for free subscribers to not be influenced by an addition of repeating networks, for the service coverage of the main broadcasting networks to not be reduced, and for service consecution to be acquired when a handoff occurs between the main broadcasting network and the repeating network.

FIG. 1 shows a block diagram for a digital broadcast transmitting system according to an embodiment of the present invention.

Referring to FIG. 1, the digital broadcast transmitting system in a single or multiple frequency network according to an exemplary embodiment of the present invention includes a main broadcasting system 110 for transmitting TPS carriers including a NIC, a mobile communication system 130 for authenticating a user and transmitting a key value for allowing a conditional access through a mobile communication network, a repeater system 120 for repeating streams of the main broadcasting station, and a subscriber terminal 140 for processing the repeated streams. Hereinafter, the main broadcasting system 110 will be correspondingly used as a main broadcasting station and the repeater system 120 will be correspondingly used as a repeater station.

First, the digital broadcast transmitting system in a single or multiple frequency network adds a scrambler 115 and a scrambling key generator 116 to the main broadcasting station so that multimedia contents may be encoded by using transmitter identification information and conditional access, and applies TPS carriers so that a subscriber station may identify that the encoded broadcasting signals are transmitted through the main broadcasting network.

Also, in the embodiment of the present invention, in the case of the single frequency network, data for the main broadcasting network and the repeating network are configured to have the same packets and guarantee signal synchronization so that the broadcasting networks are formed without interference between the main broadcasting network and the repeating network. In the case of the multiple frequency network, the main transmitter allocates another frequency and configures the same stream.

In this instance, the TPS carrier is used to transmit the parameter of transmission data and includes a NIC used as a transmitter identifying and descrambling key in the embodiment of the present invention, and the NIC substantially corresponds to a cell ID (Cell_id) or a redundancy bit in the TPS carrier which control the subscriber station to determine whether broadcasting signals are transmitted through the main broadcasting network, from which transmitter the broadcasting signals are transmitted in the main broadcasting network, or from which repeating network the broadcasting signals are transmitted. For example, the TPS carrier has 68 bits from S0 to S67 when the transmission mode is an 8K mode. In the TPS carrier, the cell ID has 8 bits from S40 to S47, and the redundancy bit has 14 bits from S54 to S67. The above-noted data are DBPSK modulated and are mapped on one carrier for each bit. The carriers can be divided on the frequency axis in the OFDM system, and hence, different transmitters or repeaters can be expressed by combination of values given at different location on the frequency axis. However, since it is difficult to find the accurate original carrier combination of carriers for the transmitter and the repeater when the carriers are combined in the overlapped area, the combination of carriers are performed by the transmitter and the repeater according to a predefined rule so that the respective carrier combination may be accurately found in the receiver. That is, IDs of transmitters can be identified by arranging the combinations without repetition when at least two signals are received from the single or multiple frequency network. For example, in the case of a cell ID, when the total 8 bits are mapped on the carriers, the main transmission network and the repeating network can be identified by defining the first 4 bits as an area to be used in the main broadcasting network and the next 4 bits as an area to be used in the repeating network. In a like manner, in the case of using the redundancy bits, total 14 bits are mapped on the carriers, and hence, the respective networks are identifiable in the overlapped area by using the first 7 bits to the main transmission network and the next 7 bits to the repeating network since the carriers on which the respective bits are mapped are provided in the areas with different frequencies. In the case of further classifying them, the transmitter and the repeater can be identified by using each bit.

FIG. 3 shows an example when the redundancy bits are used as a NIC in the TPS carrier according to an embodiment of the present invention. In FIG. 3, the two networks are identified. That is, the first 7 bits "1011001" of the redundancy bits represent an NIC for a main transmission network, and the second 7 bits "0111001" represent a NIC for a sub transmission network.

By using the above-noted method, a plurality of networks can be identified by dividing the bits into a plurality of frequency blocks in a like manner.

The main broadcasting station 110 establishes an NIC of the main broadcasting station 110 and applies the NIC so as to protect a corresponding encoding key, and periodically modifies the NIC of the main broadcasting station 110 and applies the modified NIC when performing corresponding encoding.

Further, the main broadcasting station 110 generates an encoding key for encoding an encoding algorithm and data to which an encoding key generation algorithm is applied and which are then transmitted, and encodes transmission data according to the corresponding encoding key, and the subscriber station 140 finds a received NIC and decodes the same.

Also, the repeater station 120 amplifies frequency network signals corresponding to the SFN and transmits the amplified signals, or modulates packets input by the main broadcasting station 110 through private lines, amplifies the modulated signals, and transmits the amplified signals. When repeating the packets input by the main broadcasting station 110, the repeater station 120 allocates a repeater station NIC value to be different from the main broadcasting station NIC value, and transmits it.

Further, the mobile communication system 130 transmits the decoding key value to the terminal 140 of a charged subscriber through the mobile communication network.

In addition, the subscriber terminal 140 decodes the encoded signals of the main broadcasting network included in the broadcasting signals received through the main broadcasting network or the repeating network, the NIC, and the encoding key according to a predefined decoding scheme. Also, the subscriber station 140 includes a mobile communication module, and each subscriber station transmits a proper encoded key and a decoding key for descrambling through the mobile communication, and the subscriber station having received the decoding key decodes the received data.

In further detail, referring to FIG. 1 again, the main broadcasting station 110 includes a media encoder 111, a plurality of multimedia servers 112a and 112n, a program multiplexer 113, a transmission multiplexer 114, a scrambler 115, a scrambling key generator 116, a NIC generator 117, a TPS generator 118, and a DVB-T modulator 119.

The program multiplexer 113 multiplexes video, audio, data, and data respectively provided by the contents provider's media encoder 111 or the data servers 112a to 112n, and outputs result data. The audio service is transmitted through an independent channel so as to provide a CD-quality audio service. The data service can be used to transmit text data such as lyrics of the audio service. Since the video service must include moving pictures, audio, and multiplexing/synchronizing information, the video service is transmitted after it is multiplexed into a packet through a video multiplexer. In this instance, the audio, the data, and the video service are multiplexed into a service channel by the program multiplexer 113, and a multiplexed transmission packet having information for transmitting video, audio, and other data is generated by the transmission multiplexer 114 and is then output. In this instance, the conditional access function is not performed by the program multiplexer 113 and the transmission multiplexer 114, scrambling is performed by the scrambler 115, and descrambling is performed through a NIC.

The scrambler 115 scrambles the broadcasting signal transmitted by the transmission multiplexer 114 by using a predetermined scrambling key, and the scrambling key generator 116 generates the predetermined scrambling key by using the NIC of the main broadcasting station 110. That is, the main broadcasting station 110 scrambles multimedia programs or contents, and transmits a scrambling key for descrambling the broadcasting signals according to a predetermined scrambling method, and in detail, it generates a scrambling key by using the NIC generated for identifying whether the network having transmitted the broadcasting signal by using the NIC generator 117 are a main broadcasting network or a repeating network. That is, the main broadcasting station 110 and the repeater station 120 transmit the NIC so that the subscriber station 140 may identify whether the transmitted broadcasting signals are main broadcasting network signals or repeating network signals. The scrambling key generated by the scrambling key generator 116 is transmitted to the mobile communication system 130 as a descrambling key value.

TPS generator 118 inserts the NIC generated by the NIC generator 117 into one of the cell ID of the TPS carrier and the redundancy bit.

The DVB-T modulator 119 transmits broadcasting signals that are generated by modulating the scrambled broadcasting signals, the scrambling key, and the main broadcasting station NIC according to the DVB-T method to the subscriber through the main broadcasting network.

The DVB-T modulator 119 will now be described with reference to FIG. 2.

Figure 2:
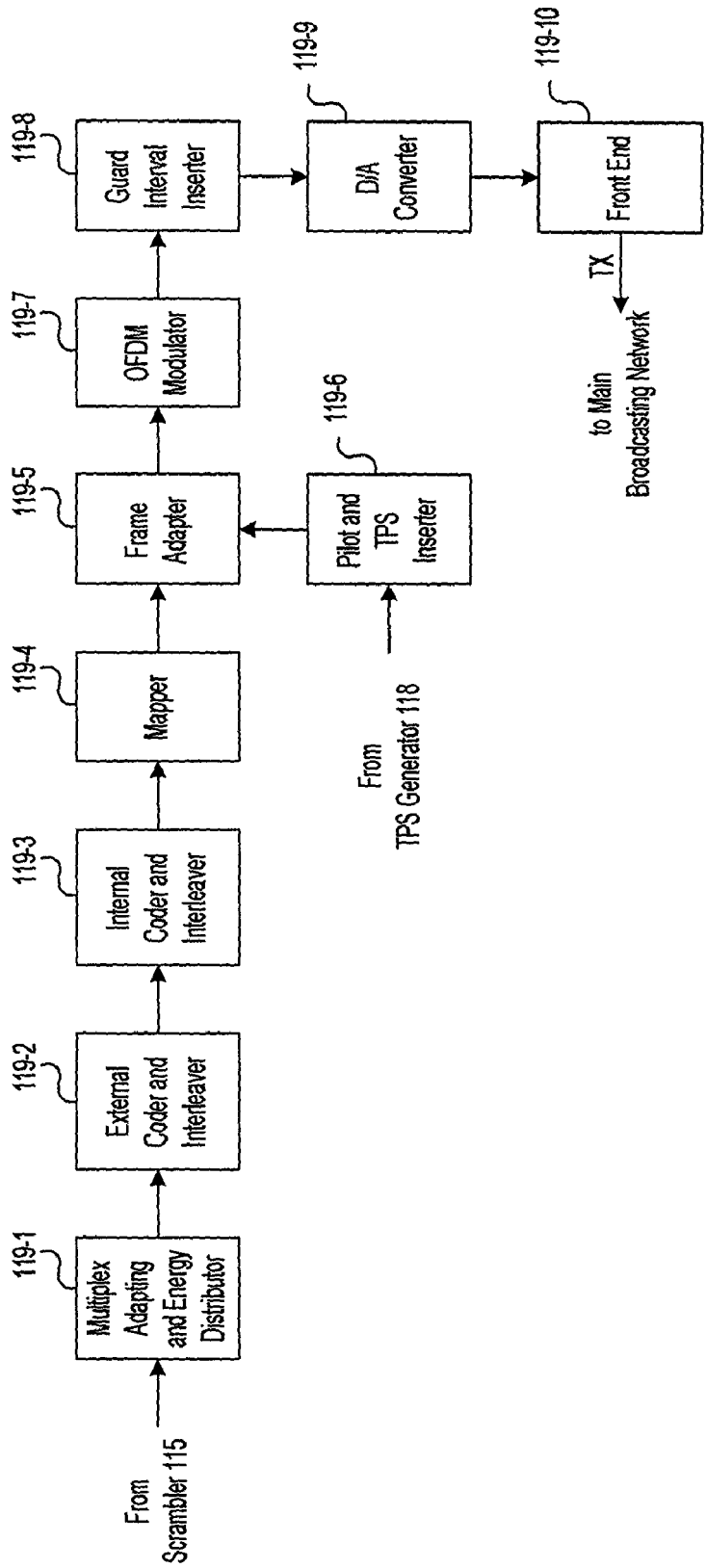
FIG. 2 shows a detailed block diagram for a DVB-T modulator shown in FIG. 1.

FIG. 2 shows a detailed block diagram for the DVB-T modulator shown in FIG. 1.

As shown in FIG. 2, the DVB-T modulator 119 includes a multiplex adapting and energy distributor 119-1, an external coder and interleaver 119-2, an internal coder and interleaver 119-3, a mapper, 119-4, a frame adapter 119-5, a pilot and TPS inserter 119-6, an OFDM modulator 119-7, a guard interval inserter 119-8, a D/A converter 119-9, and a front end 119-10.

The multiplex adapting and energy distributor 119-1 distributes energy by randomizing the scrambled packet data output by the scrambler to prevent signal concentration, and sets the average signal power as 0.

The external coder and interleaver 119-2 performs external coding on the data randomized by the multiplex adapting and energy distributor 119-1 and interleaves the coded data on the time axis so as to prevent burst errors.

The internal coder and interleaver 119-3 performs internal coding so as to restore errors on the bit basis, and performs interleaving on the frequency axis.

The mapper 119-4 maps the data output by the internal coder and interleaver 119-3 according to the modulation method such as the QPSK or QAM, and the frame adapter 119-5 changes the data mapped by the mapper 119-4 into frame type data.

The pilot and TPS inserter 119-6 provides a pilot for indicating packet transmission information and a TPS carrier generated by the TPS generator 118 to the frame adapter 119-5 so as to be combined with the frame type data.

The OFDM modulator 119-7 OFDM modulates the data output by the frame adapter 119-5 per frame, and the guard interval inserter 119-8 inserts a guard interval to the data output by the OFDM modulator 119-7.

The D/A converter 119-9 converts the data output by the guard interval inserter 119-8 into baseband analog signals, and the front end 119-10 transmits the analog signals output by the D/A converter 119-9 to the main broadcasting network so that the analog signals may be transmitted to the subscriber.

Further, the repeater station 120 may include an on-channel repeater 121 and a repeater station NIC inserter 122, and in this instance, the repeater station 120 amplifies and transmits signals of the main broadcasting network corresponding to the single or multiple frequency network, or modulates, amplifies, and repeats the packets input by the main broadcasting station 110 through the private line. In the case of repeating the stream, the NIC value of the repeater station 120 is reallocated to be different from the value of the main broadcasting station 110 so that it is disallowed for the free subscribers to receive signals within the coverage of the repeating network.

Also, the mobile communication system 130 includes a user authentication server 131, and transmits a descrambling key for descrambling the scrambled broadcasting signals to the charged subscriber's terminal. Further, the mobile communication system 130 periodically transmits the key to the subscriber station 140 through a mobile communication network or the Internet so that the subscriber station 140 may descramble the key and acquire the corresponding scrambling key.

Also, the charged subscriber receives a descrambling key through the mobile communication system 130 to descramble the conditional access broadcasting signals and thereby receive a charged service from the repeating network.

Figure 4:
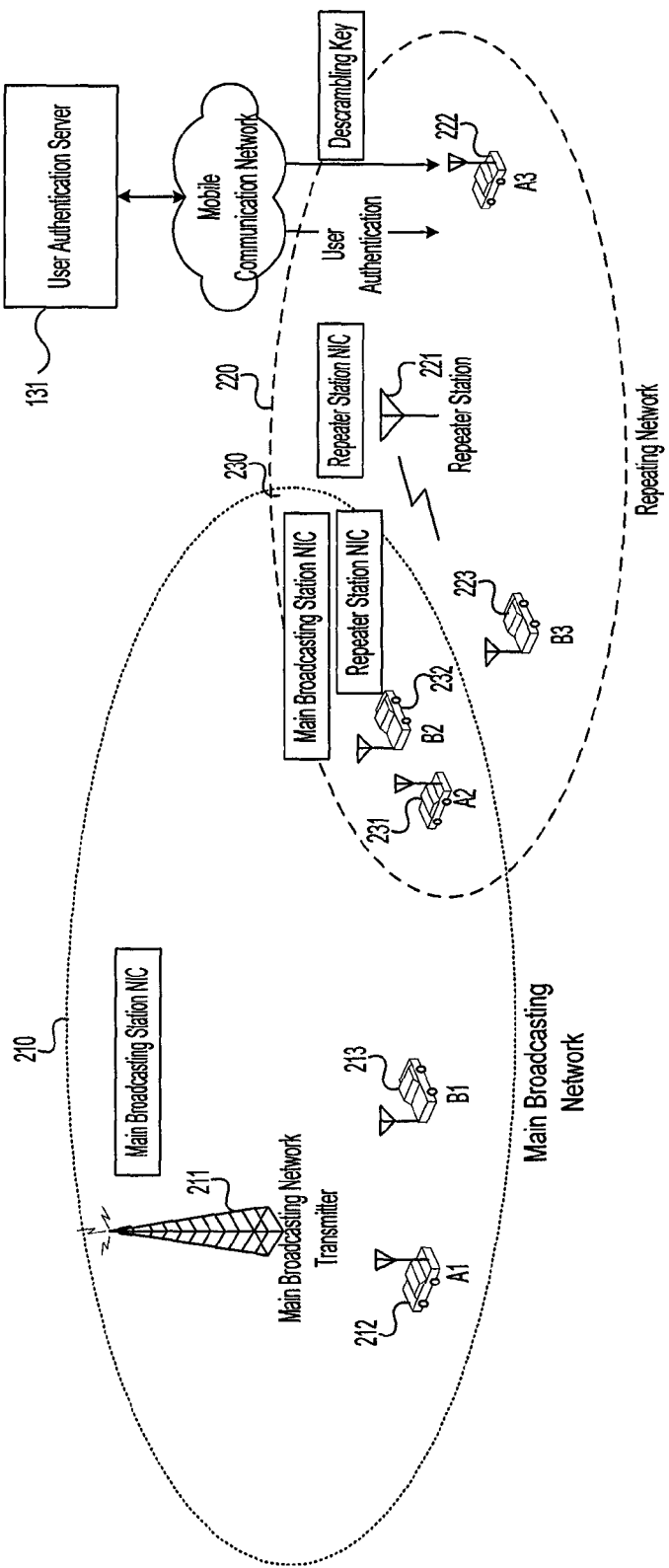
FIG. 4 shows a schematic diagram for the concept of a digital broadcast transmission and receiving service according to an embodiment of the present invention.

FIG. 4 shows a schematic diagram for the concept of a digital broadcast transmission and receiving service in a single or multiple frequency network according to an embodiment of the present invention.

Referring to FIG. 4, the digital transmitting and receiving service region in the single or multiple frequency network has a main broadcasting network 210, a repeating network 220, and an area 230 with overlapped main broadcasting network coverage and repeating network coverage.

The main broadcasting network 210 has a main broadcasting network transmitter 211, and a charged subscriber 212 (A1) and a free subscriber 213 (B1) receive a main broadcasting network NIC transmitted by a main broadcasting network transmitter 211 as a key value.

The repeating network 220 has a repeater station 221, and a charged subscriber 222 (A3) and a free subscriber 223 (B3) receive a repeating network NIC transmitted by the repeater station 221 as a key value. In this instance, since a descrambling key value is transmitted from the user authentication server 131 to the charged subscriber 222 on the repeating network 220 through the mobile communication network, the charged subscriber 222 on the repeating network 220 can receive a broadcasting service, but the free subscriber 223 can receive no broadcasting service because he has no descrambling key.

Also, in the overlapped area 230 of the main broadcasting network coverage and the repeating network coverage, the charged subscriber 231 (A2) and the free subscriber 232 (B2) receive the main broadcasting network NIC from the main broadcasting network transmitter 211 or repeating network NIC from the repeater station 221.

In other words, the embodiment of the present invention has a configuration allowing conditional access of the broadcasting network according to scrambling and descrambling, and the charged subscribers A1, A2, and A3 can receive the main broadcasting network NIC, the repeating network NIC, and a mobile communication descrambling key, and the free subscribers B1, B2, and B3 can receive the main broadcasting network NIC and repeating network NIC, and as a result, as to the combination of received keys, the main broadcasting network NIC transmitted by the main broadcasting network transmitter 211 or the descrambling key received from the mobile communication network is determined to be a key combination to be descrambled.

Figure 5:
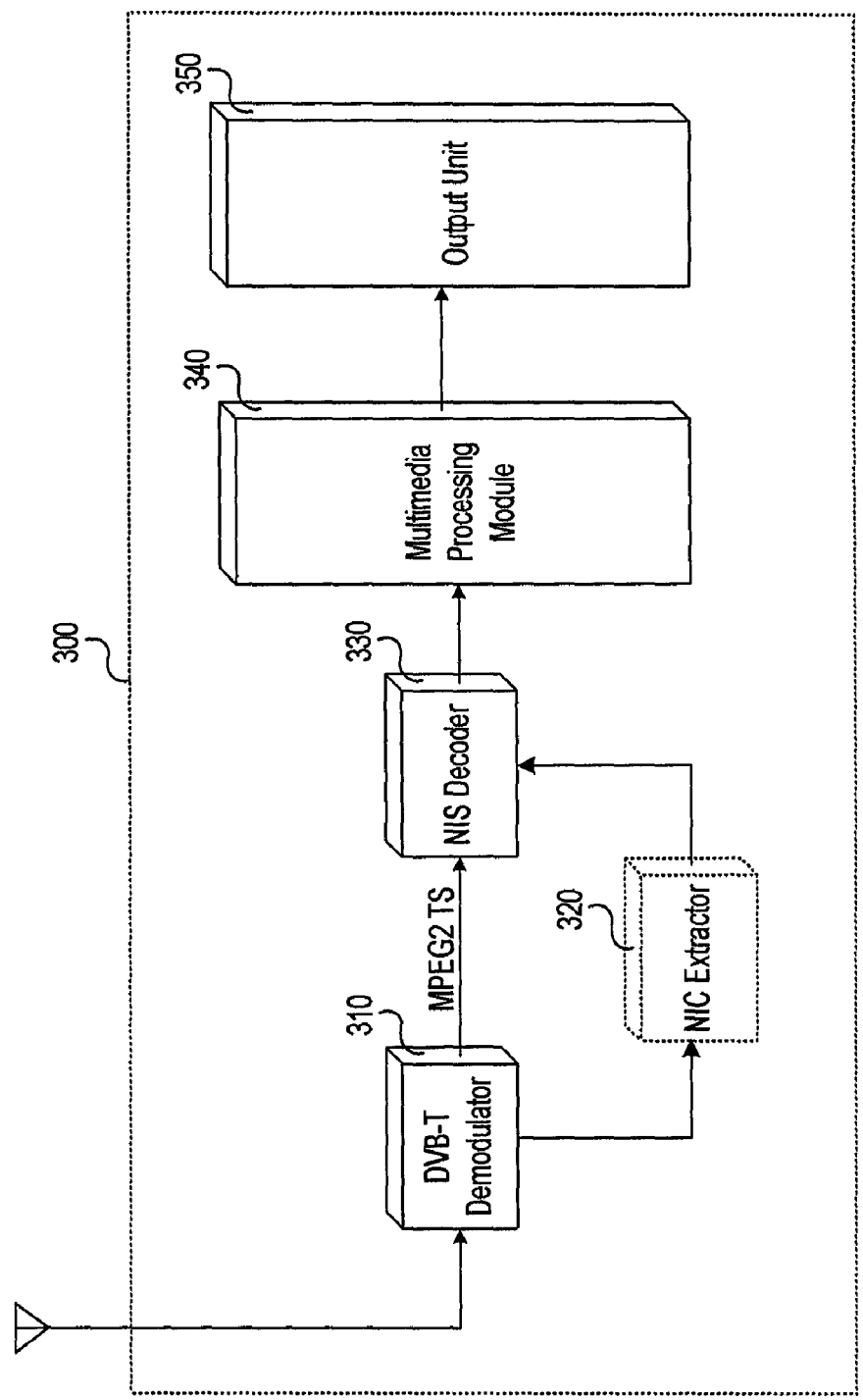
FIG. 5 shows a schematic diagram for a digital broadcasting receiving terminal according to an embodiment of the present invention.

FIG. 5 shows a schematic diagram for a digital broadcasting receiving terminal in a single or multiple frequency network according to an embodiment of the present invention, and for example, the subscriber station 300 including a mobile station includes a DVB-T demodulator 310, a NIS extractor 320, a NIS decoder 330, a multimedia processing module 340, and an output unit 350, and it has a descrambling algorithm for descrambling the scrambled broadcasting signals as a program. That is, the subscriber station 300 has programmed functions for identifying the received NIC, descrambling the key to acquire a corresponding scrambling key, and descrambling the received data by using the scrambling key.

In detail, on receiving the scrambled broadcasting signals through the antenna, the DVB-T demodulator 310 of the subscriber station 300 demodulates the broadcasting signals received by selecting a corresponding channel according to the DVT-T method and outputs scrambled broadcasting signals and TPS carrier.

The NIC extractor 320 extracts the NIC included in the TPS carrier output by the DVB-T demodulator 310.

When the signals output by the DVB-T demodulator 310 are scrambled broadcasting signals, the NIS decoder 330 descrambles MPEG2 TS packet data by using the NIC extracted by the NIC extractor 320 and the descrambling key. In this instance, the descrambling key is used when it is provided from the mobile communication system 130. To perform this, the subscriber station 300 has a mobile communication module for receiving the mobile communication service which will not be described since it is well known to a skilled person.

Also, the multimedia processing module 340 receives data output by the NIS decoder 330 and processes the data that are displayable by the output unit 370.

Further, the subscriber station 300 can additionally include a USB port (not shown), and the USB port can be used when the subscriber station 300 accesses the Internet to receive a descrambling key through a mobile communication network.

The DVB-T demodulator 310 will be described referring to FIG. 6.

Figure 6:
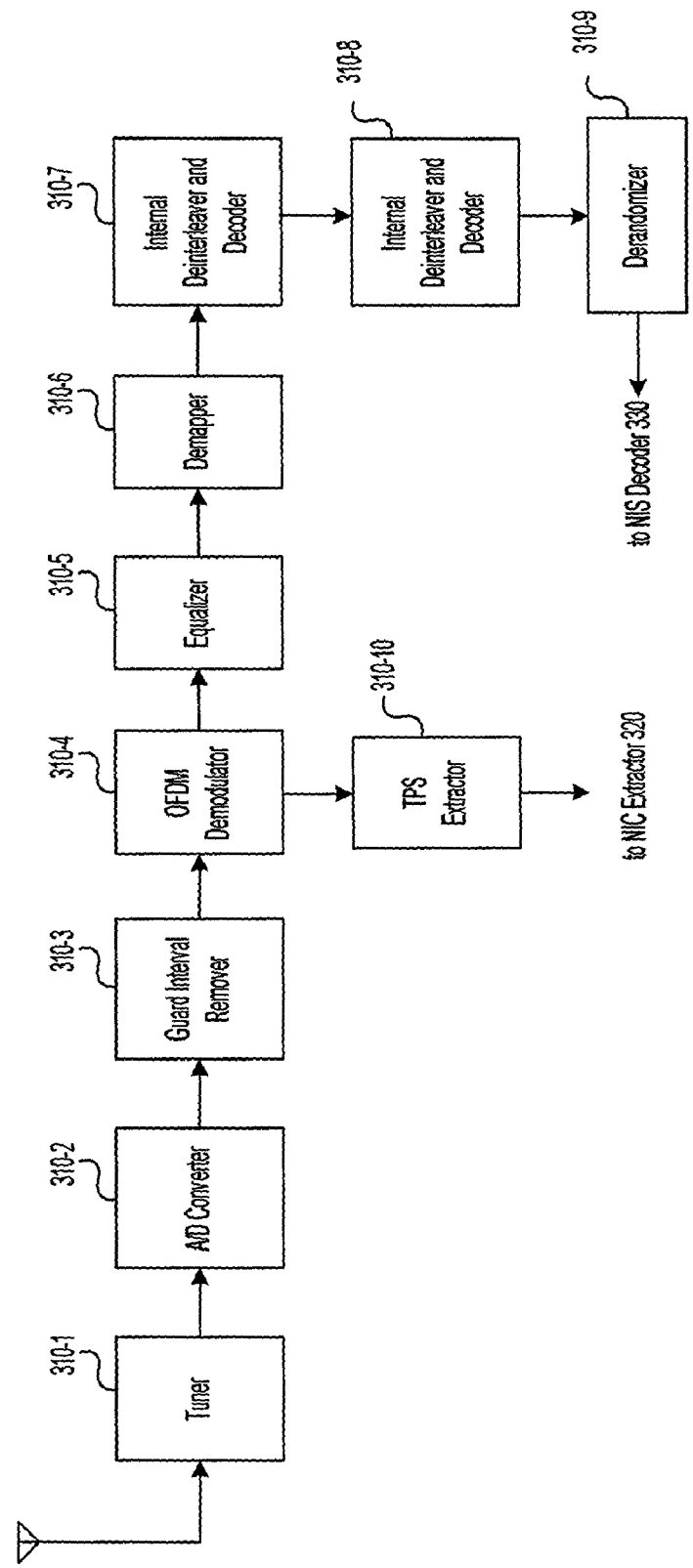
FIG. 6 shows a detailed block diagram for a DVB-T demodulator shown in FIG. 5.

FIG. 6 shows a detailed block diagram for the DVB-T demodulator shown in FIG. 5.

As shown in FIG. 6, the DVB-T demodulator 310 includes a tuner 310-1, an A/D converter 310-2, a guard interval remover 310-3, an OFDM demodulator 310-4, an equalizer 310-5, a demapper 310-6, an internal deinterleaver and decoder 310-7, an external deinterleaver and decoder 310-8, a derandomizer 310-9, and a TPS extractor 310-10.

The DVB-T demodulator 310 is performed in the reverse course of the process of the DVB-T modulator described with reference to FIG. 2.

The tuner 310-1 tunes the broadcasting signals through the antenna and outputs analog signals, and the A/D converter 310-2 converts the analog signals into digital signals.

The guard interval remover 310-3 removes a guard interval from the digital signals, and the OFDM demodulator 310-4 demodulates the digital signals without the guard interval on the frame basis, and outputs demodulated signals.

The equalizer 310-5 equalizes the OFDM demodulated data to compensate for carriers distorted by the channel, and the demapper 310-6 demaps the data output by the equalizer 310-5 according to the mapping method of the transmitted data.

The internal deinterleaver and decoder 310-7 internally deinterleaves the data output by the demapper 310-6 for the respective symbols and bits and then internally decodes the internally deinterleaved data.

The external deinterleaver and decoder 310-8 performs external deinterleaving and external decoding on the internally decoded data, and the derandomizer 310-9 derandomizes the externally decoded data into signals to be input to the DVB-T modulator 119 of the transmitter and outputs the signals to the NIS decoder 330.

The TPS extractor 310-10 extracts the TPS carrier from the signals output by the OFDM demodulator 310-4 and transmits the TPS carrier to the NIC extractor 320.

FIG. 7 shows conditional access service availability for subscriber types and receiving locations according to an embodiment of the present invention.

FIG. 7 shows a table for combinations that are received depending on the position of the subscriber receiver and the subscription type shown in FIG. 4, and the charged subscriber can receive signals from the main broadcasting network 210 and the repeating network 220, and the free subscriber can receive the signals from the main broadcasting network 210, thereby allowing the conditional access depending on the transmitters.

Figure 8:
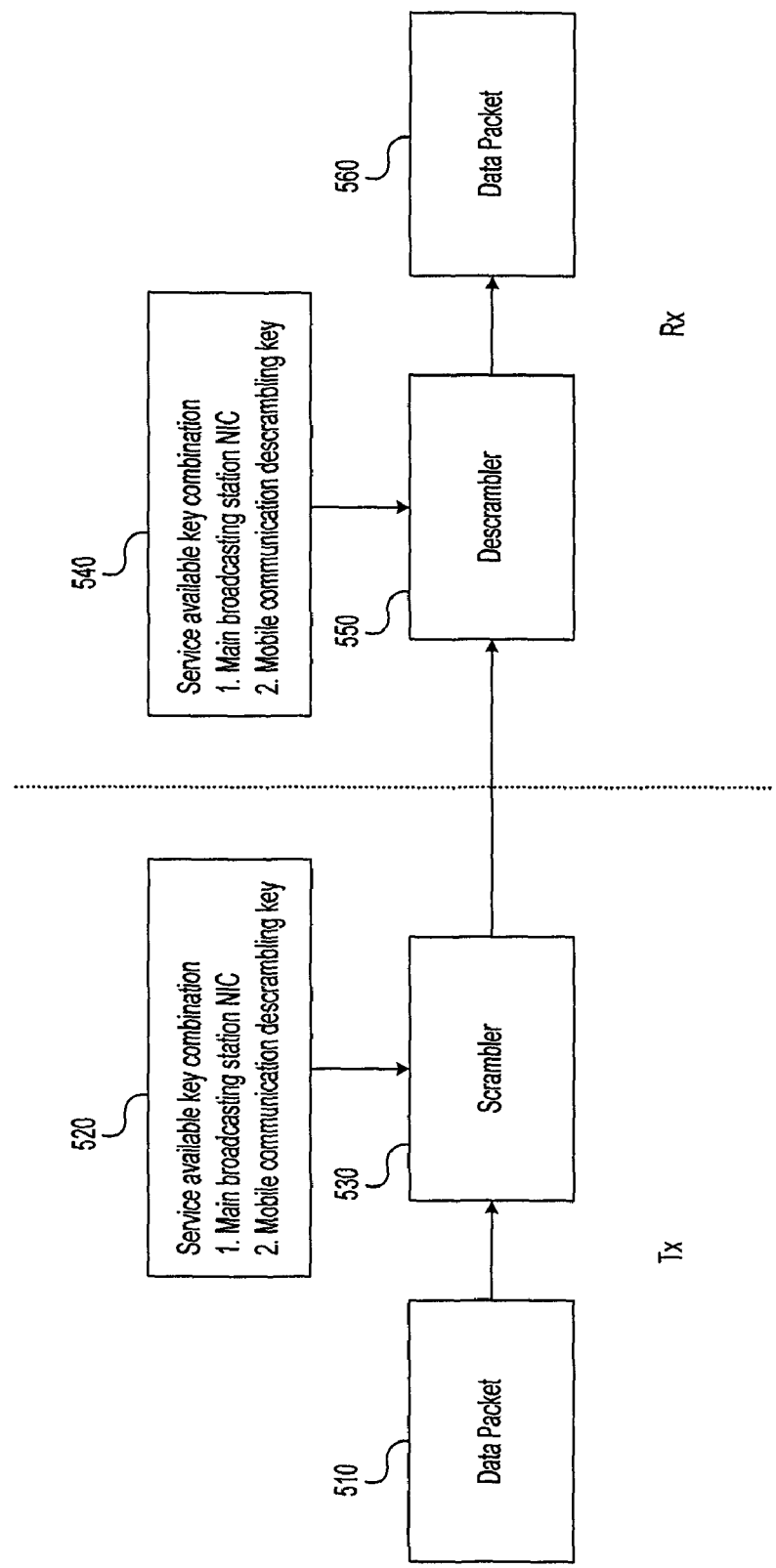
FIG. 8 shows a block diagram for scrambled transmission and receiving by a digital transmission system and a receiving terminal depending on a transmitter according to an embodiment of the present invention.

FIG. 8 shows a block diagram for scrambled transmission and receiving by a digital broadcasting receiving terminal in a single or multiple frequency network according to an embodiment of the present invention.

Referring to FIG. 8, a data packet 510 on the transmission part is encoded by scrambling by the scrambler 530, and in this instance, the main broadcasting station's NIC value or a mobile communication descrambling key 520 is used for the encoding. In this instance, the scrambling process represents a process for scrambling transmittable multimedia data according to a predetermined rule, and thus changes signals so that no user without entitlement can view programs.

Also, as to the descrambling key by the receiving part, the descrambler 550 performs descrambling according to the NIC value of the main broadcasting station or the mobile communication descrambling key 540 to decode the scrambled data into the original data packet 560.

In this instance, a free subscriber can receive the NIC of the main broadcasting station, and a charged subscriber can receive both the NIC of the main broadcasting station and a mobile communication descrambling key.

Therefore, the free subscriber can receive the NIC from the main broadcasting station, and he cannot receive signals from the repeating network since the repeating network transmits a repeater station NIC value that is different from a main broadcasting station NIC value, and the charged subscriber can receive signals through the main broadcasting network and can receive signals by using a descrambling key received from the mobile communication through the repeating network.

A problem at the transmission part is that the free subscriber can receive signals through the repeating network when he stores the NIC value that is received within the main broadcasting network and then moves to the repeating network. In order to solve the problem, an encoding server in the main broadcasting station periodically modifies a main broadcasting station NIC value, and the problem of scrambling the data packet is solved by applying the modified NIC value.

Figure 9:
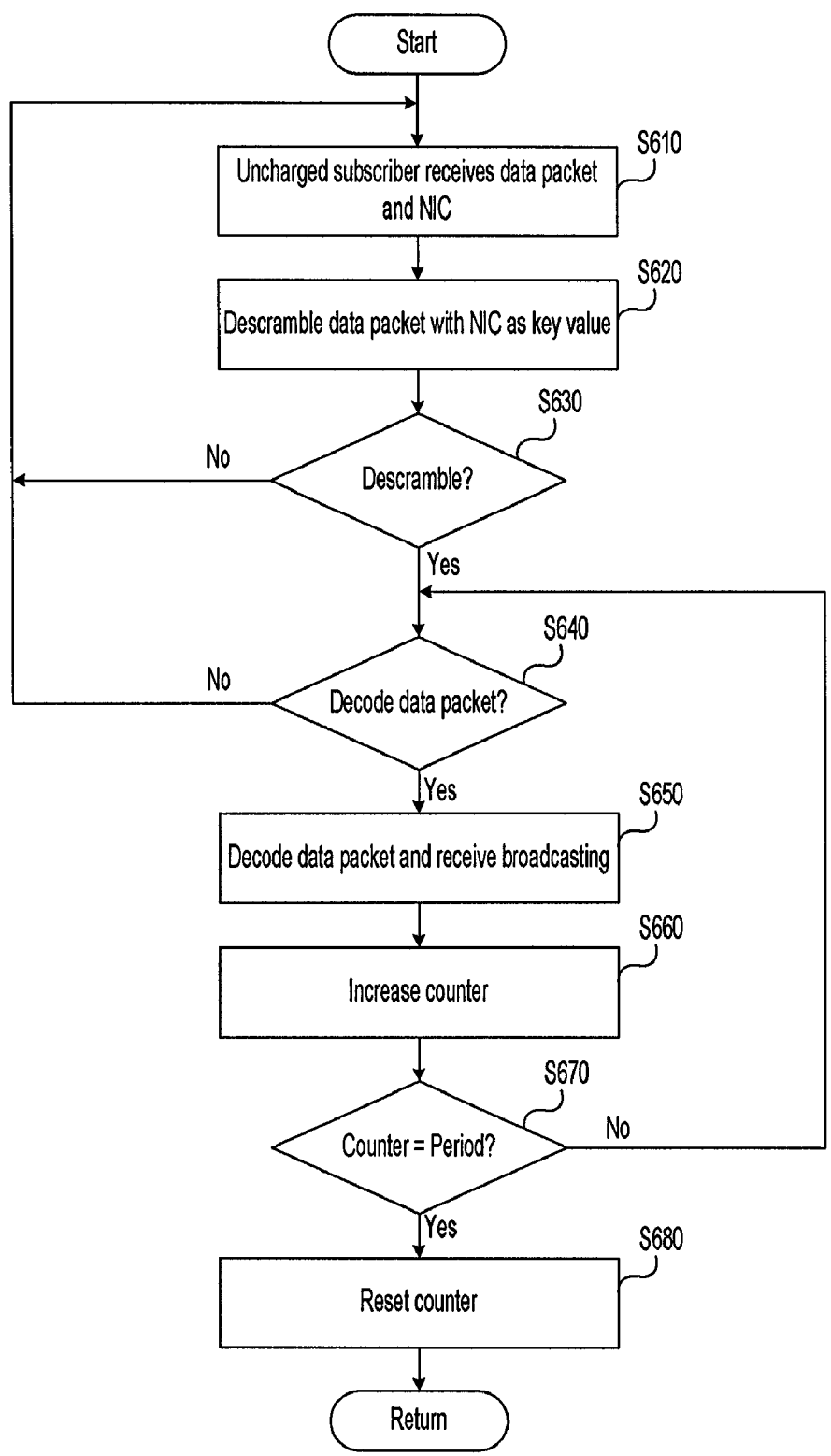
FIG. 9 shows a flowchart for a digital broadcast receiving method by a free subscriber station according to an embodiment of the present invention.

Referring to FIG. 9, a digital broadcasting receiving method by a free subscriber in a single or multiple frequency network according to an embodiment of the present invention will now be described.

A free subscriber receives a data packet and a NIC in step S610, searches the received NIC value, and descrambles the received data packet by using the searched value as a key value in step S620

It is checked whether the data packet can be descrambled by a terminal of the free subscriber in step S630, and when the data packet can be descrambled, it is checked whether the data packet can be decoded in step S640. When the data packet can be decoded, the data packet is decoded to receive broadcast signals in step S650.

However, as described above, when the free subscriber stores the NIC value received within the main broadcasting network and then moves to the repeating network, the free subscriber can receive signals in the repeating network. In order to solve the problem, an encoding server in the main broadcasting station periodically modifies the main broadcasting station NIC value, and the problem of scrambling the data packet is solved by applying the modified NIC value.

In detail, in the case of receiving broadcast signals by decoding the data packet, a counter of the receiving terminal is increased in step S660, it is checked whether the value of the counter corresponds to a predetermined period value in step S670, and when they do not correspond to each other, the above-noted steps S640 to S660 are repeated until the counter corresponds to the period value. When the counter corresponds to the period value, the counter is reset in step S680. In this instance, the period value is generated by modifying the main broadcasting station NIC value by the encoding server of the main broadcasting station, and when the value of the counter in the free subscriber receiving terminal corresponds to the period value, the counter is reset, and hence, the free subscriber's receiving of signals in the repeating network is prevented when the free subscriber stores the NIC value given within the main broadcasting network and moves to the repeating network.

The free subscriber's receiving terminal may fail to normally receive broadcast signals since the receiving terminal cannot descramble signals in the previous step of S630 or cannot decode the data packet in the previous step S640.

In other words, the free subscriber's receiving terminal normally receives signals in the main broadcasting network, but it receives no signals in the repeating network. That is, the free subscriber's receiving terminal periodically searches for the NIC value, and when the receiving terminal moves to the repeating network from the main broadcasting network to generate a handoff, a NIC value received from the repeating network is applied as the above-noted NIC value, and in this instance, since the data packet is not descrambled, the receiving terminal cannot receive normal broadcast signals from the repeating network.

As a result, the method for a free subscriber to receive digital broadcasting in a single or multiple frequency network cannot analyze the descrambled packet or decode the same, and cannot normally receive broadcast signals because of a lack of a descrambling key.

Figure 10:
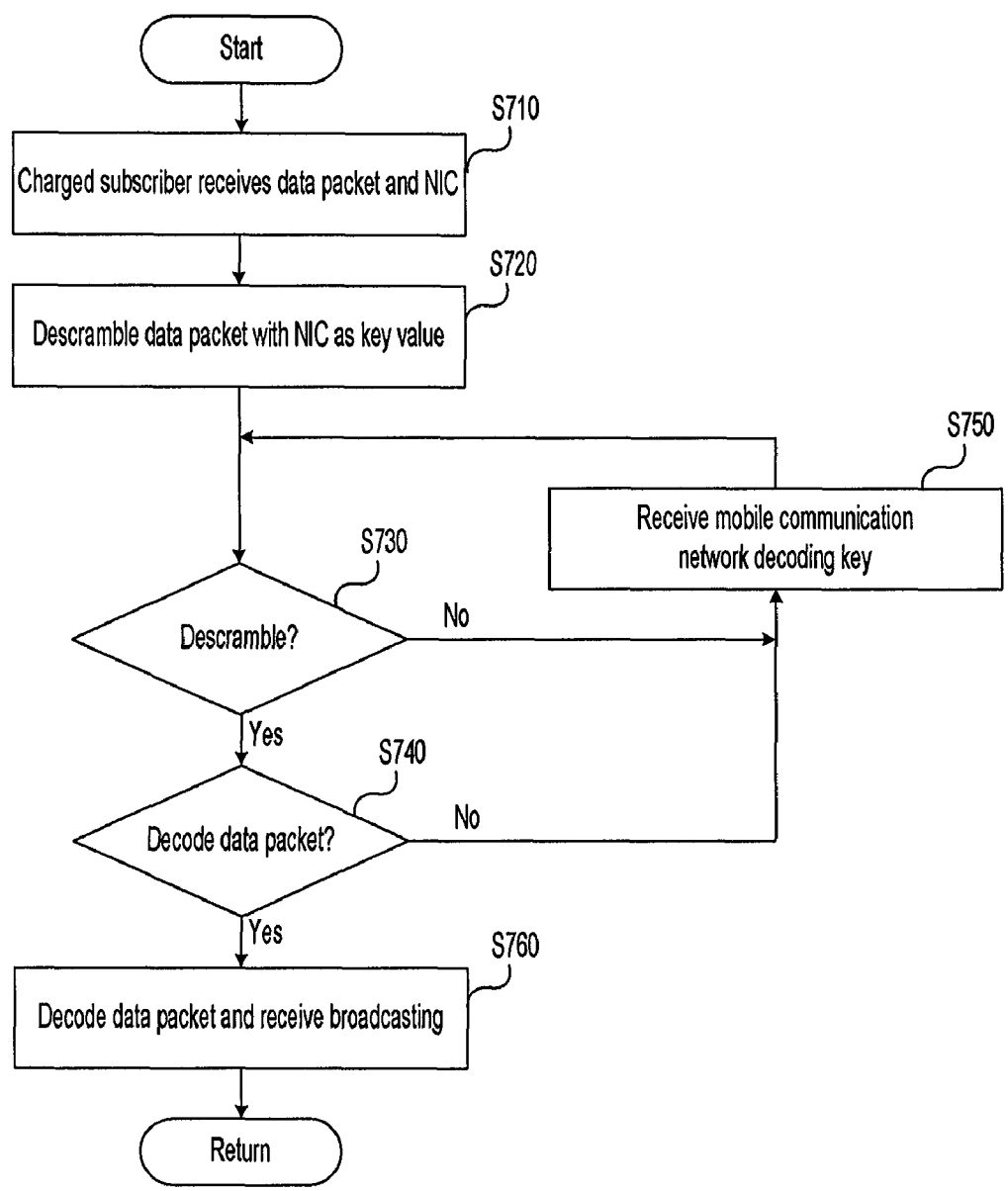
FIG. 10 shows a flowchart for a digital broadcast receiving method by a charged subscriber station according to an embodiment of the present invention.

Referring to FIG. 10, a method for a charged subscriber to receive digital broadcasting in a single or multiple frequency network according to an embodiment of the present invention will now be described.

A charged subscriber receives a NIC and a data packet within the main broadcasting network or the repeating network in step S710, searches for the received NIC, and descrambles the received packet by using the NIC value as a key value in step S720.

Next, it is checked whether the data packet can be descrambled by the charged subscriber's terminal in step S730, it is checked whether the data packet can be decoded in step S740 when the data packet can be descrambled, and the scrambling process is performed to normally receive broadcast signals in step S760 when the data packet can be decoded.

When the data packet cannot be descrambled in the previous step of S730, or the data packet descrambled in S740 cannot be decoded, a descrambling key is received from the mobile communication network in step S750. That is, when the received packet is not descrambled or decoded by using the NIC value received by the charged subscriber's terminal, for example, when the charged subscriber's receiving terminal moves to the repeating network from the main broadcasting network to generate a handoff, the charged subscriber receives the descrambling key through the mobile communication network and performs scrambling based on the value thereby allowing receiving of signals in the repeating network.

In this instance, the charged subscriber's receiving terminal periodically searches for the NIC value, receives a descrambling key from the mobile communication network, and normally receives broadcast signals in the repeating network when the receiving terminal moves to the repeating network from the main broadcasting network to generate a handoff and it cannot normally receive broadcast signals.

As a result, the method for the charged subscriber to receive digital broadcasting in the single or multiple frequency network according to an embodiment of the present invention allows receipt of a descrambling key from a mobile communication network and receipt of normal broadcast signals when data packets cannot be descrambled or decoded in the repeating network.

In other words, when the free subscriber's terminal is in the repeating network, the terminal cannot normally receive broadcast signals, the subscriber can normally receive the broadcast signals when he switches himself to a charged subscriber and then receives a descrambling key from the mobile communication network, and the switching to the charged service activates the repeater business of repeater service providers.

It has been described that the conditional access is allowed by identifying the transmitting network in the DVB-T digital broadcasting, and in addition, it is possible that the conditional access is allowable in the DVB-H digital broadcasting based on the DVB-T method by adding the NIC into the TPS carrier, which will be easily understood by a person of an ordinary skill in the art.

Further, it will be also easily understood by a person of an ordinary skill in the art that the conditional access is allowable to the charged subscribers by directly transmitting the NIC and the broadcasting signal or adding the NIC to other signals and then transmitting the same together with the broadcasting signals in the general digital broadcasting system as well as the DVB-T or DVB-H based digital broadcasting.

Also, it is possible to combine characteristics of contents transmitted by using mobile digital broadcasting and the NIC, scramble the combined data, transmit scrambled data, and allow the conditional access to the charged subscriber station.

The services for providing the contents include the transport protocol experts group (TPEG) service for compressing traffic information on expressways, local roads, and urban roads, accident information, climates, and stocks information.

Figure 11:
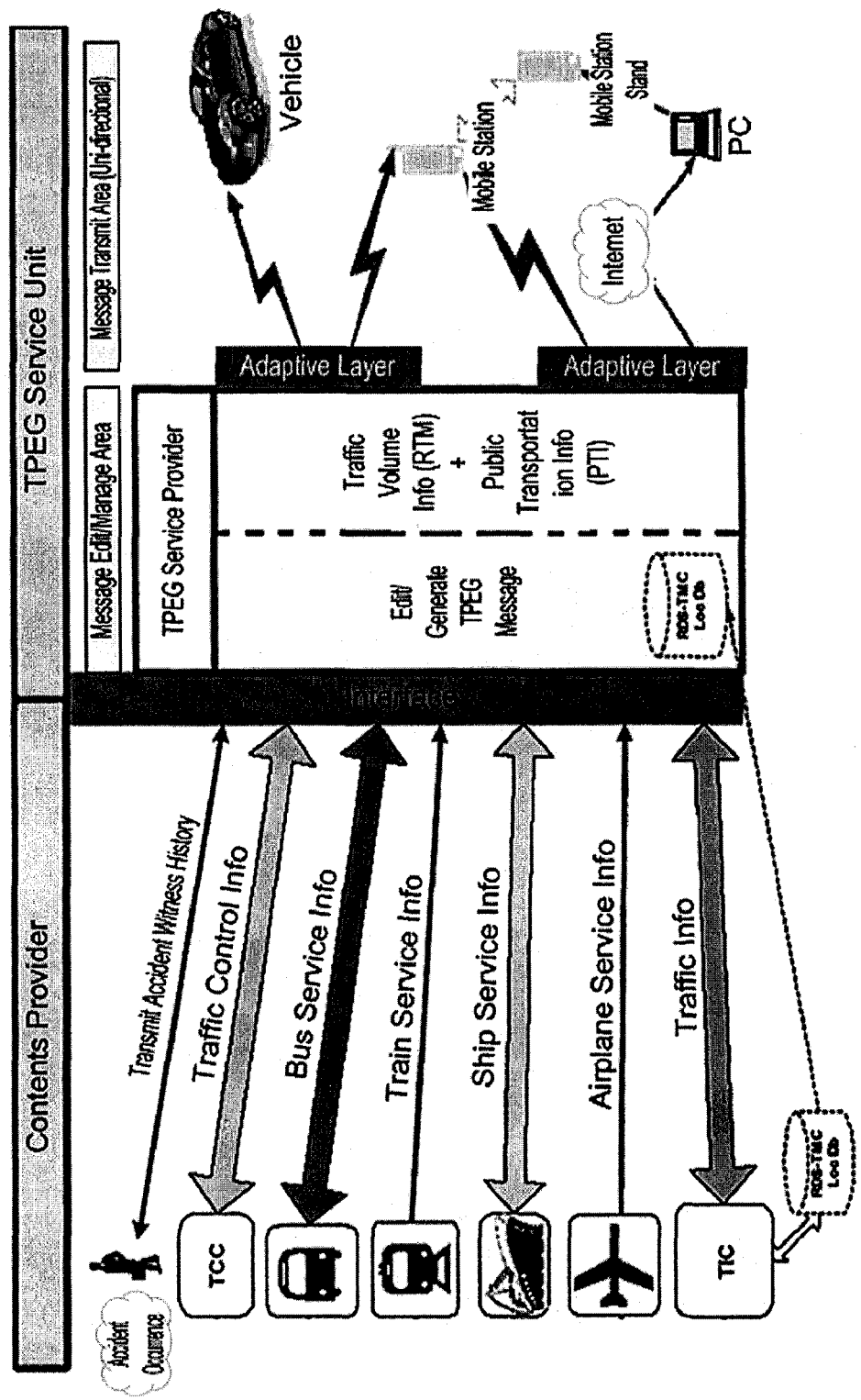
FIG. 11 shows a conceptual diagram for a TPEG service.

FIG. 11 shows a schematic view for a TPEG service.

A user who has witnessed an accident, a traffic control center (TCC), a bus service provider, a train service provider, a ship service provider, an airplane service provider, and a traffic information center (TIC) generate contents and transmit the contents to a TPEG service provider so as to receive a corresponding TPEG service.

The TPEG service provider edits and generates a TPEG message by using the received contents. In this instance, the TPEG service provider can share RDS-TMC (Radio Data System-Traffic Message Center) database with the traffic information center so as to provide traffic information.

On generating the TPEG message, the TPEG service provider can additionally generate and add a road traffic message (RTM) and public transport information (PTI).

When the TPEG message is generated by the TPEG service provider, the TPEG message is transmitted to a vehicle or a mobile terminal through a wireless device so that the user may receive the TPEG service. Also, the TPEG service is provided by transmitting a TPEG message to a personal computer through the Internet, controlling the user to directly connect the personal computer and the mobile terminal, storing the received TPEG message in the mobile terminal, or transmitting the TPEG message to the mobile terminal through a mobile terminal stand.

Regarding providing the TPEG service, the TPEG service provider needs to provide a specific service to a specific subscriber in order to provide quality services. For example, it is possible to control the charged subscriber to receive a TPEG service in the service area of the repeater station and concurrently conditionally access a scrambled TPEG message.

The TPEG message is transmitted through a TPEG-SNI (Service and Network Information application) when it is transmitted from the main broadcasting system 110 or the repeating system 120 to the mobile terminal 140, and the TPEG-SNI is a standard including information on the services and networks available by the TPEG service system, and includes TPEG contents running time, TPEG contents descriptions, and contents information on allowance or access condition, and is provided when the TPEG service is provided.

The TPEG-SNI transmitting the TPEG message includes an area for showing a 1-byte scrambling indicator, and the scrambling indicator area having the value of 0 represents that the transmitted TPEG message is not scrambled, and the scrambling indicator area having the value other than 0 represents that the transmitted TPEG message is scrambled.

Therefore, when a specific scrambling indicator is used together with the NIC in the TPEG message, the conditional access in the repeater station area and the conditional access for the TPEG message are simultaneously provided.

In further detail, the program multiplexer 113 extracts scrambling indicators from the TPEG-SNIs for transmitting the TPEG contents, and stores the scrambling indicators before receiving the TPEG contents from the servers (112a, . . . , 112n) for providing TPEG contents and multiplexing the TPEG contents. In this instance, the respective TPEG contents display the states whether the TPEG contents are scrambled by the scrambling indicator.

The scrambler 115 uses the NIC generated by the NIC generator 117, the scrambling key generated by the scrambling key generator 116, and the stored scrambling indicator to scramble the TPEG messages multiplexed by the transmission multiplexer 114 and transmit the scrambled TPEG messages through mobile digital broadcasting.

In a like manner, the repeater station 120 reallocates broadcasting signals transmitted by the main broadcasting station 110 as a NIC value of the repeater station 120, and transmits the same to the terminal 140. Also, the scrambling key and the scrambling indicators used for scrambling the TPEG messages in the main broadcasting station 110 are transmitted to the charged subscriber station 140 through the mobile communication system 130.

The charged subscriber station 140 identifies the received NIC to extract the scrambling key and the scrambling indicators, and uses the extracted scrambling key and the scrambling indicators to descramble the received broadcasting signals and acquire the TPEG message. The above-noted process is available for the charged subscriber station 140, and the free subscriber station 140 cannot receive the scrambling key and the scrambling indicators from the mobile communication system 130 and thus cannot receive the TPEG message in the conditional access area such as a service area of the repeater station 120.

Also, the conditional access by the charged subscriber station 140 is allowed since the charged subscriber station 140 can descramble the scrambled TPEG messages by applying the extracted scrambling indicators to the TPEG messages.

The TPEG service has been described in the above, and it is possible to allow the conditional access to the charged subscriber in the case of providing various multimedia data services as well as the TPEG service through the mobile broadcasting network.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, repeater service providers can activate repeater business and main broadcasting network service providers can extend the broadcasting networks as the repeater service providers provide charged repeater services according to the digital broadcasting transmitting and receiving method in the single or multiple frequency network.

Also, since the conditional access to the TPEG service is allowable through a receiver of a previously authenticated specific subscriber, it is possible to provide charged quality TPEG contents, and prevent unregistered user from using the contents without permission since security for provision of TPEG contents is improved. Therefore, since the security of the TPEG service provided through the broadcasting network is improved, it is possible to provide the TPEG contents for specific groups or persons such as government men, soldiers, and medical staffs by generating a key table for the specific groups or persons.

What is claimed is:

1. A system for transmitting digital broadcasting comprising:

a main broadcasting system for adding a data packet through a main broadcasting network and a network identification code (NIC) to broadcasting signals, scrambling the broadcasting signals by using a predetermined scrambling key, and outputting scrambled broadcasting signals, wherein the main broadcasting system scrambles the predetermined key by using the NIC and transmits the scrambled key as a descrambling key;

a repeating system for repeating the scrambled broadcasting signal transmitted by the main broadcasting system through a repeating network, wherein the repeating system adds a second NIC of the repeating network to the scrambled broadcasting signals and the repeating system outputs the modified scrambled broadcasting signals to a subscriber station on the repeating network, the second NIC is different from the NIC of the main broadcasting network and the second NIC is used for representing modified scrambled broadcasting signals outputted from the repeating system; and a mobile communication system for receiving the descrambling key from the main broadcasting system or the repeating system and transmitting the same to a charged subscriber station wherein the charged subscriber station descrambles the scrambled broadcasting signals by using the NIC extracted from the scrambled broadcasting signals and the descrambling key, the NIC is also used for identifying whether the scrambled broadcasting signal is from the main broadcasting system or the repeating system.

2. The system of claim 1, wherein the digital broadcasting is based on the DVB-T (Digital Video Broadcasting-Terrestrial) method, and the NIC is included in a transmission parameter signaling (TPS) carrier used for transmitting a parameter of transmission data according to the DVB-T method.

3. The system of claim 2, wherein the NIC is included in one of a cell ID in the TPS carrier and a redundancy bit.

4. The system of claim 1, the main broadcasting system comprising:
   a multiplexer for multiplexing additional information related to broadcasting contents and outputting the same as a broadcasting signal;
   a scrambler for scrambling the broadcasting signal multiplexed by the multiplexer by using the predetermined scrambling key;
   a network identification code (NIC) generator for generating the NIC for a transmission network, wherein the NIC is included in a transmission parameter signaling (TPS) carrier used for transmitting a parameter of transmission data according to a digital video broadcasting-terrestrial (DVB-T) method;
   a scrambling key generator for generating the predetermined scrambling key used by the scrambler by using the NIC generated by the NIC generator;
   a TPS generator for inserting the NIC into the TPS carrier and generating a transmission TPS carrier; and
   a DVB-T modulator for modulating the scrambled broadcasting signal output by the scrambler and the TPS carrier generated by the TPS generator and outputting modulated signals to a subscriber station.

5. The system of claim 4, wherein the NIC generator periodically changes the NIC to create a changed NIC, and the scrambling key generator, the TPS generator, and the DVB-T modulator perform scrambling or generate respective signals by applying the changed NIC.

6. The system of claim 5, wherein the scrambling key generator establishes the scrambling key that is changed by the changed NIC as a descrambling key value, and transmits the descrambling key value.

7. The system of claim 4, wherein the NIC is included in one of a cell ID or a redundancy bit in the TPS carrier.

8. The system of claim 7, wherein areas for the cell ID and the redundancy bit are classified by transmission networks and respectively have a NIC.

9. The system of claim 4, wherein the broadcasting contents include audio, video, and data.

10. The system of claim 4, wherein the broadcasting contents include data.

11. A method for transmitting digital broadcasting comprising:
   a) multiplexing additional information related to broadcasting contents and generating a broadcasting signal;
   b) scrambling the generated broadcasting signal by using a predetermined scrambling key, and generating a scrambled broadcasting signal;
   c) inserting a network identification code (NIC) into the scrambled broadcasting signal for identifying the transmission network having transmitted the scrambled broadcasting signal, wherein the transmission network includes a main broadcasting network and a repeating network; and
   d) transmitting the scrambled broadcasting signal, wherein the predetermined scrambling key is scrambled by the NIC to be thus output as a descrambling key wherein the descrambling key together with the NIC is used to descramble the scrambled broadcasting signal transmitted in d),
   wherein the main broadcasting network adds the NIC of the main broadcasting network to the broadcasting signals and outputs the broadcasting signals to a subscriber station on the main broadcasting network, the NIC is used for decoding the scrambled broadcasting signals outputted from the main broadcasting network in a subscriber station on the main broadcasting network and the NIC is used to represent the scrambled broadcasting signals outputted from the main broadcasting system and the NIC is also used for identifying whether the scrambled broadcasting signal is from the main broadcasting system or the repeating system, and
   wherein the repeating network adds a second NIC of the repeating network to the scrambled broadcasting signals and outputs modified scrambled broadcasting signals to a subscriber station on the repeating network, the second NIC is different from the NIC of the main broadcasting network and the second NIC is used for representing the modified scrambled broadcasting signals outputted from the repeating network.

12. The method of claim 11, wherein the digital broadcasting is based on the DVB-T (Digital Video Broadcasting-Terrestrial) method, and the NIC is included in a transmission parameter signaling (TPS) carrier used for transmitting a parameter of transmission data according to the DVB-T method.

13. The method of claim 11, wherein the NIC is changed for each predetermined period to create a changed NIC, and the broadcasting signal is scrambled by applying the changed NIC.

14. The method of claim 11, wherein the predetermined scrambling key is scrambled by using the NIC, and is transmitted as a descrambling key to a charged subscriber station through a mobile communication network.

15. The method of claim 11, further comprising, after d), e) controlling the repeating network to receive the scrambled broadcasting signal and repeat the scrambled broadcasting signal to the subscriber station.

16. The method of claim 15, wherein, in e), on repeating the broadcasting signal, the repeating network changes the NIC of the received broadcasting signal, allocates a changed NIC as the repeating NIC corresponding to the repeating network, and transmits the the repeating NIC.

17. The method of claim 11, wherein the broadcasting contents include audio, video, and data.

18. The method of claim 11, wherein the broadcasting contents include data.

19. A terminal for receiving DVB-T (Digital Video Broadcasting-Terrestrial) digital broadcasting comprising:
   a DVB-T demodulator for demodulating a signal received through an antenna according to the DVB-T method and outputting a transmission parameter signaling (TPS) carrier used for transmitting scrambled broadcasting signals and a parameter of transmission data wherein the TPS carrier includes a network identification code (NIC);
   a NIC extractor for extracting the NIC from the TPS carrier output by the DVB-T demodulator;

a decoder for decoding the scrambled broadcasting signal output by the DVB-T demodulator according to a decoding algorithm by using the NIC extracted from the NIC extractor; and a multimedia processor for processing the data decoded by the decoder and outputting the data to the user, wherein the terminal decodes the scrambled broadcasting signal by using the NIC which is used for identifying whether the scrambled broadcasting signal is from a main broadcasting or a repeating network, wherein the main broadcasting network adds a data packet and the NIC of the main broadcasting network, which is used for representing the scrambled broadcasting signals outputted from the main broadcasting network, to a broadcasting signal, scrambles the broadcasting signal by using a predetermined scrambling key, and outputs the scrambled broadcasting signal to the terminal on the main broadcasting network, and wherein the repeating network adds a second NIC of the repeating network to the scrambled broadcasting signal and outputs a modified scrambled broadcasting signal to the terminal on the repeating network, the second NIC is different from the NIC of the main broadcasting network and the second NIC is used for representing the modified scrambled broadcasting signal outputted from the repeating network.

20. The terminal of claim 19, wherein when the user of the receiving terminal is a charged subscriber, the decoder externally receives a predetermined descrambling key in order to descramble the scrambled broadcasting signal.

21. The terminal of claim 19, wherein the decoder externally receives a predetermined descrambling key in order to descramble the scrambled broadcasting signal.

22. The terminal of claim 20, wherein the receiving terminal includes a mobile communication module, and the descrambling key is received from a predetermined mobile communication network through the mobile communication module.

23. The terminal of claim 19, wherein the decoder decodes a received descrambling key to extract a predetermined descrambling key by using the NIC that was extracted, and decodes the broadcasting signal by descrambling the scrambled broadcasting signal by using the predetermined descrambling key.

24. The terminal of claim 19, wherein the decoder periodically receives a descrambling key through the mobile communication network.

25. A method for receiving, by a terminal, digital broadcasting comprising:

a) receiving broadcasting signals including a data packet and a network identification code (NIC), wherein the NIC identifies the transmission network having transmitted the broadcasting signals;

b) demodulating the broadcasting signals to extract the NIC;

c) analyzing the NIC that is extracted to determine whether the transmission network that transmitted the broadcasting signals that were received is a repeating network; and d) descrambling and outputting the broadcasting signals by using the NIC and a descrambling key when it is determined that the transmission network that transmitted the broadcasting signal is the repeating network, wherein the terminal decodes the broadcasting signal by using the NIC which is used for identifying whether the broadcasting signal is from a main broadcasting network or the repeating network, wherein the main broadcasting network adds a data packet and the NIC of the main broadcasting network to a broadcasting signal, scrambles the broadcasting signal by using a predetermined scrambling key, and outputs the scrambled broadcasting signal to the terminal on the main broadcasting network, the NIC is used for representing the broadcasting signals outputted from the main broadcasting network, and wherein the repeating network adds a second NIC of the repeating network to the scrambled broadcasting signals and outputs modified scrambled broadcasting signals to the terminal on the repeating network, the second NIC is different from the NIC of the main broadcasting network and the second NIC is used for representing the modified scrambled broadcasting signals outputted from the repeating network.

26. The method of claim 25, wherein the digital broadcasting is based on the DVB-T (Digital Video Broadcasting-Terrestrial) method, and the NIC is included in a transmission parameter signaling (TPS) carrier used for transmitting a parameter of transmission data according to the DVB-T method.

27. The method of claim 26, wherein b) comprises:
demodulating the broadcasting signal and extracting a TPS carrier; and
extracting the NIC from the extracted TPS carrier.

28. The method of claim 25, wherein the descrambling key used in d) is periodically received through a mobile communication network.

29. The method of claim 25, wherein, c) comprises descrambling and outputting the broadcasting signals by using the NIC when it is determined that the transmission network having transmitted the broadcasting signal is not a repeating network.

* * * * *

UNITED STATES PATENT AND TRADEMARK OFFICE
CERTIFICATE OF CORRECTION

PATENT NO.         : 8,014,525 B2                                    Page 1 of 1
APPLICATION NO.    : 11/815954
DATED              : September 6, 2011
INVENTOR(S)        : Hong It is certified that error appears in the above-identified patent and that said Letters Patent is hereby corrected as shown below:

Title page, item

"(73) Assignee: KTFREETEL Co., Ltd., Seoul (KR)" should read

--(73) Assignee: KT Corporation, Seongnam (KR)--.

Signed and Sealed this
Twentieth Day of December, 2011

David J. Kappos
*Director of the United States Patent and Trademark Office*